United States Patent [19]

Genovese et al.

[11] Patent Number: 5,370,597
[45] Date of Patent: Dec. 6, 1994

[54] METHOD FOR MANUFACTURING ANTIMICROBIAL VACUUM CLEANER BAG

[75] Inventors: Vincent P. Genovese, Forth Worth; Thomas J. Stephens, Plano, both of Tex.; Fernando Del Corral, Memphis, Tenn.

[73] Assignee: Southwest Manufacturers & Distributors, Inc., Fort Worth, Tex.

[21] Appl. No.: 60,873

[22] Filed: May 12, 1993

Related U.S. Application Data

[60] Division of Ser. No. 871,647, Apr. 21, 1992, Pat. No. 5,240,484, which is a continuation-in-part of Ser. No. 731,289, Jul. 16, 1991, abandoned, which is a continuation of Ser. No. 511,836, Apr. 13, 1990, abandoned, which is a continuation of Ser. No. 198,324, May 25, 1988, abandoned, which is a continuation-in-part of Ser. No. 76,035, Jul. 21, 1987, abandoned.

[51] Int. Cl.$^5$ .............................................. B31B 49/04
[52] U.S. Cl. ..................................... 493/186; 493/937; 493/941
[58] Field of Search ............... 493/186, 328, 329, 330, 493/937, 941

[56] References Cited

U.S. PATENT DOCUMENTS

| | | | |
|---|---|---|---|
| 3,116,969 | 1/1964 | Coleman | 422/120 |
| 3,728,847 | 4/1973 | Howard et al. | 55/371 |
| 4,675,032 | 6/1987 | Genovese et al. | 95/282 |

FOREIGN PATENT DOCUMENTS

| | | | |
|---|---|---|---|
| 2417287 | 9/1979 | France | 493/941 |

*Primary Examiner*—William E. Terrell
*Attorney, Agent, or Firm*—Charles D. Gunter, Jr.

[57] ABSTRACT

A vacuum cleaner bag is treated with a dual component, antimicrobial composition which reduces harmful bacteria and fungi safely and effectively. The vacuum cleaner bag is used on an upright vacuum cleaner and includes a porous cloth body which is treated with the dual component, antimicrobial composition.

4 Claims, 3 Drawing Sheets

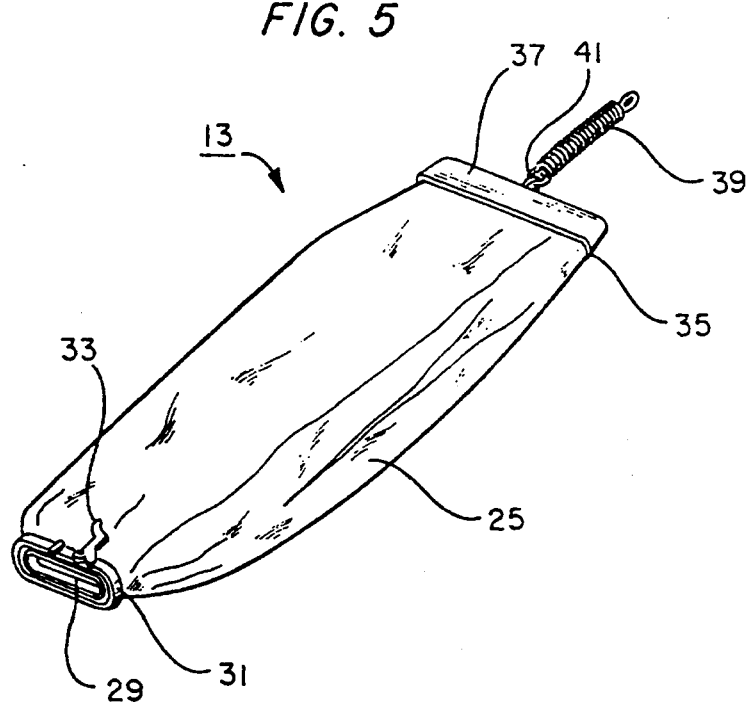
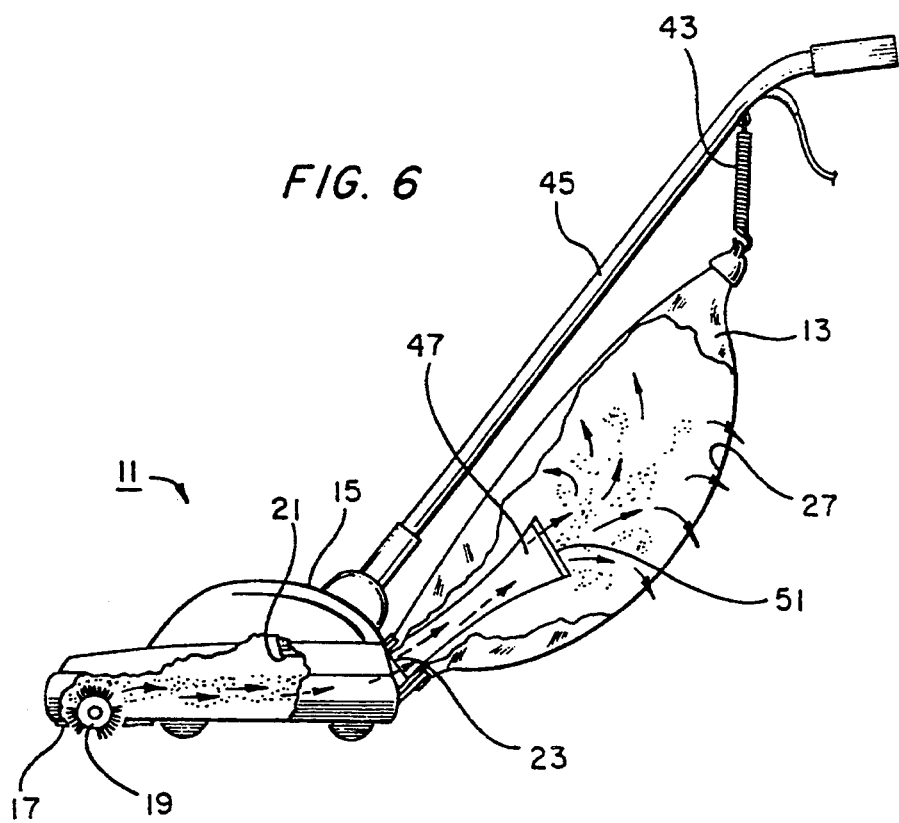

METHOD FOR MANUFACTURING ANTIMICROBIAL VACUUM CLEANER BAG

BACKGROUND OF THE INVENTION

This is a divisional application of Ser. No. 07/871,647, filed Apr. 21, 1992, U.S. Pat. No. 5,240,484, which was a continuation-in-part of Ser. No. 07/731,289, filed Jul. 6, 1991 now abandoned, which was a file wrapper continuation of 07/511,836, filed Apr. 13, 1990, now abandoned, which was a file wrapper continuation of 07/198,324, filed May 25, 1988, now abandoned. The application 07/198,324 was a continuation-in-part of 07/076,035, filed Jul. 21, 1987, now abandoned.

1. Field of the Invention

This invention relates in general to bag assemblies for upright vacuum cleaners, and more particularly, to a re-useable cloth bag treated with a dual component antimicrobial treatment which prevents the build-up of bacteria and fungi within the bag and the bag's fibers.

2. Description of the Prior Art

A vacuum cleaner removes dirt, dust and other foreign material from a surface being cleaned and deposits them in a dirt collecting bag. The vacuum cleaner main housing carries a vacuum generating means referred to as a "motor-fan unit" which creates a flow of dirt laden air through the housing into the dirt collecting bag. The vacuum pressure generated in the main housing draws the dirt laden air through the housing and through an air duct into the dirt collecting bag which is attached by a mouth opening to the air duct.

The dirt collecting bag is formed with a porous material, such as cloth, and functions to filter all the dirt laden air and collect the dirt and dust within the bag. Filtered air passes through the bag's sidewalls and is exhausted into the atmosphere. Commercial upright vacuums often feature a dirt collecting bag of simple cloth construction. Unlike many home vacuum cleaners with disposable paper filters, the cloth commercial bag is re-used repeatedly during the twelve to sixteen month lifespan of the bag. After the bag fills with dirt, the user removes the bag from the vacuum cleaner housing and dumps the dirt through an end opening into the trash. The bag is then reinstalled and the process is repeated.

The reusable nature of the bags creates potential problems in commercial and industrial applications, such as hospitals, doctor's offices, hotels, restaurants, dealers in rental goods, and the like. During business hours, a large number of people pass through the work areas. These people include both the employees and the patrons of the establishments. For example, in a pediatrician's office, many children with their parents enter the office in any one day. Most children are healthy and present for a check-up. Other children have a wide range of problems from diseases to wounds and injuries. Whether healthy or ill, the patients can cough, sneeze and track microorganisms into the office and on the carpeting.

Another example is a restaurant. During the course of the day, food and dirt particles constantly drop to the floor. Patrons bring into the restaurant all the microbiological flora on their clothes and person. Diners remove their Jackets, brush their clothes, rub their hands. They wipe food from their mouths which falls to their laps. The diners leave the table and brush the food particles from their laps, effectively brushing other particles from their clothing. Patrons may use the toilet, tracking microorganisms from the toilet area back into the dining area. Both spills and cleaning tables moisten the floor.

The mere presence of people enriches the environment for microbes. Humans naturally shed skin cells and hair during the course of a day and with them their microbiological flora. Proper hygiene, such as hand washing, reduces the amount of microbiological flora. Unfortunately, proper hygiene is difficult to enforce within the public domain.

All of these particles of food, dust, dirt, skin cells, hair, and the like provide an excellent medium for bacterial and fungal population growth. A good vacuum cleaner picks up these particles from the floor and deposits them into the bag. This also inoculates the bag with the bacteria and fungi associated with the particles. A vacuum cleaner bag thus provides a rich environment for growth if sufficient water is present. The bag is enclosed and at warm temperatures, ideal conditions for the proliferation of many microorganisms. Every time the bag is used, more "growth medium" and more inoculum are deposited and concentrated within the bag. Dumping the bag decreases the amount of material for microbiological growth. However, the microorganisms can still grow on the remaining residue within the bag and on the bag fibers. In many commercial situations, frequent dumping of the bag's contents is rare. Even if the microbes do not grow, they can still survive inside the bag in a stationary cycle of cell growth.

For example, testing the fabric and contents from a used vacuum cleaner bag yielded large numbers of bacteria and fungi. A bag from a restaurant had almost one hundred times more bacteria per square inch of fabric than two other bags used while cleaning other commercial establishments. The restaurant bag yielded approximately one million bacteria/sq. in. when grown under conditions which select for bacteria. Many of the bacteria were benign and of the strains normally associated with the soil. This same bag also contained *Staphylococcus* strains normally associated with the human skin and enteric bacteria associated with human feces. Fungi were recovered from all three bags at approximately ten thousand fungi/sq. in. when grown under conditions selective for fungi. The predominant types appeared to be of the *Pencillium* genus and black spore formers.

While most microorganisms found within a vacuum cleaner bag are harmless, others are not. Some microorganisms have the capability of becoming opportunistic pathogens. Strains of bacteria, such as members of the *Bacillus* genus, are common food spoilage organisms and can cause severe food poisoning, for instance, *B. cereus*. Other *Bacilli*, *B. anthracis* for example, are highly infectious pathogens. Members of the *Staphylococcus* bacterial genus vary from the benign to the pathogenic, for example food poisoning and other illnesses such as hospital-acquired infections. *Staphylococcus* requires little water for survival and can easily proliferate within the confines of a vacuum cleaner bag and its fibers when conditions are favorable, such as the increase in moisture content after vacuuming up damp debris. Fungi, such as *Asperigillus niger*, often grow on fabric of the bag, causing undesirable discoloration. This fungal growth may reduce the fabric's tensile strength which weakens the fabric and leads to tearing and a premature reduction in the bag's lifespan. Some fungi are associated with food spoilage and some are human pathogens, for example, the yeast *Candida albicans*. Many bacteria and fungi contribute unpleasant odors and undesirable stains to the bag. Further, microbial growth on the fabric poses a health hazard if pathogenic strains establish a niche and proliferate.

The process of cleaning stirs up aerosols of dust, dirt particles, bacteria and fungi from the carpeting. These aerosols are a good method of transferring microorganisms from room to room. A good vacuum cleaner bag effectively filters the particles, but cannot sterilize the air vented through the pores of the fabric. A pore size adequately small to filter out bacteria clogs easily. A vacuum cleaner bag with clogged pores, cannot adequately discharge the air to the atmosphere and suction up the dirt. Clogged pores prematurely reduce the life of a bag.

Even if the vacuum cleaner bag does not directly contaminate the various areas of use, the bag can contaminate the vacuum cleaner users. Cleaning personnel do not usually use gloves and masks when dumping the contents of a vacuum cleaner bag. During dumping, aerosols of debris form around the trash receptacle and contaminate the atmosphere. Cleaning personnel breathe this debris as well as contaminate their clothing and exposed skin and hair. These workers leave this trash area and seed the areas they enter.

In the past some techniques were developed to reduce the problems associated with the build-up of dirt within the vacuum cleaner bag. For example, U.S. Pat. No. 4,675,032, issued Jun. 23, 1987, and assigned to the assignee of the present invention, provided a substantial improvement in nondisposable cloth bags. The invention incorporated an "oscillator tube" within the bag interior which served to vibrate the bag in use and prevent buildup of dirt on the bag's interior sidewalls. Because dirt buildup was reduced, the bag was cleaner in operation.

Other prior art techniques are ineffectual for preventing microbiological growth in a reusable cloth vacuum cleaner bag. Some filter the dust and dirt. Filtering the exhausted air through a vacuum cleaner bag does not prevent microbiological growth within the bag. Filtering merely prevents the larger dirt particles from exhausting with the air.

Some prior art techniques from the past fifty years suggest using some type of chemical treatment such as disinfectants or deodorants. However, this prior art either uses general terms such as "sticky germicidal substance", U.S. Pat. No. 2,188,428, or vaguely mentions some chemical treatment to inhibit microbiological growth, U.S. Pat. No. 3,907,530, or to treat the exhausted air, U.S. Pat. No. 2,272,394. While this prior art agrees that microbial contamination of the vacuum cleaner bag is a problem, it does not reveal a specific remedy.

Actual antimicrobial treatments have been described for some time, although to the best of Applicant's knowledge these treatments are not applied to nondisposable cloth vacuum cleaner bags and never in combination with Applicant's "oscillator." This is due, in part, to the fact that the available antimicrobial treatments were not practical for use in an application such as a cloth vacuum cleaner bag. For example, members of the class of antifungal agents, the bromosalicyl anilides, are highly insoluble in aqueous solutions, requiring solubility in N,N-Dimethylformamide which is highly flammable and can dissolve many synthetic fibers. Another class of antimicrobials are members of the phenol family, such as o-phenyl phenol which is a carcinogen as well as a fungicide and a bactericide. Phenols are poisonous and chronic poisoning is known in industrial settings. The antimicrobial agent hexachlorophene is a potential neurotoxin that is regulated by the FDA. Organoarsenical compounds are hazardous to the environment. The organosilanes covalently bond to the substrate. Although organosilanes are effective against single layers of microorganisms, they are ineffective against clumps of microorganisms. Since organisilanes have not been tested in nondisposable vacuum cleaner bags, their effectiveness in the bag environment is unknown. Neomycin sulfate and other similar antibacterial agents require uptake into the cell. Uptake requires the agent to detach or leach from the substrate in order to enter the cell. This leaching reduces the amount of agent available to attack the microbes during the lifetime of the vacuum cleaner bag.

Other techniques describe treating disposable, paper vacuum cleaner bags. For instance, one technique describes treating a disposable paper vacuum cleaner bag with humic acid, a treatment ineffective in reducing microbial growth in practice. Japanese Patent Application No. SHO61-271013. Other techniques require the use of disposable bags, paired with additional inserts which are costly and not used in commercial applications. See, for example, U.S. Pat. Nos. 3,274,758 (envelope with volatile deodorant granules), and 5,040,264 (strip impregnated with chemicals). These techniques require the replacement of the insert with a fresh insert with new chemicals each time the bag is dumped. Apparently the treatment loses effectiveness through the volatility or instability of the chemicals used. The inserts do not work on nondisposable bags because there is no way to replace them each time the bag is dumped. The inserts cannot be simply thrown loosely into the bag, but must be attached within the bag. If these inserts are not attached, they can fall into the mouth opening of the bag, therefore reducing the efficiency of the vacuum cleaner. Another technique suggests vacuuming a substance into the bag, which needs an antimicrobial treatment with a solid volatile component.

Some disinfectants are volatile. The amount of active disinfectant incorporated onto the vacuum cleaner bag fabric can be substantially reduced at the high temperatures used in textile manufacturing. The vacuum cleaner bag also heats during use, increasing the volatility of the disinfectant. The amount of disinfectant is further reduced with every use. The volatile disinfectant exhausts through the pores of the bag into the outside air, consequently exposing the vacuum cleaner user to the emissions.

To the Applicant's best knowledge, none of the prior art describes the efficacy of such antimicrobial treatment. One item of prior art calls for a fresh bag and treatment every time the bag is dumped, thereby suggesting the treatment has a only a short period of effectiveness. U.S. Pat. No. 5,040,264. None of the prior art describes whether the treatment is effective against bacteria and/or fungi. Many disinfectants are effective against only one type of microbe and not the other. For example, disinfectants often have more than one active ingredient, which improves the disinfectant spectrum of activity. Furthermore, disinfectants with more than one active ingredient inhibit microorganisms from acquiring resistance to the disinfectant.

Efficacy of the disinfectants is rated by testing the effectiveness of the concentration of their active ingredient(s) against various microorganisms over a certain length of time. Some of these variables affect how broad the spectrum of activity is and the length of time the activity lasts. Therefore, efficacy depends on concentration and time after manufacture.

Effective disinfectants are potent chemicals. Disinfectants often create problems to the people exposed to them and to the environment. Some people exposed to the disinfectants become sensitized to them. Sensitization causes physical problems ranging from contact dermatitis to severe allergic reactions such as asthma. Incorrectly used, disinfectants can harm the people who come in contact with them. Disinfectants can also contaminate the ground or water when incorrectly used and disposed.

Because of the problems associated with chemical treatments of vacuum cleaner bags, safety, efficacy and toxicity of antimicrobial treatments are of vital concern. One object of the present invention is to produce an effective composition with antibacterial and antifungal activity to treat a nondisposable, cloth vacuum cleaner bag that is safe to use.

The present invention also has as its object the provision of a bag for a vacuum cleaner which greatly reduces the chances of harboring harmful bacteria and fungi for the life of the bag, even when the bag is repeatedly re-used in commercial applications.

Another object of the invention is the provision of a vacuum cleaner bag which is treated with an antibacterial and antifungal composition. The antimicrobial composition attaches to the material of the bag and inhibits the growth of bacteria and fungi and remains effective for the life of the bag.

Another object of the present invention further reduces the growth of potentially dangerous bacteria and fungi within cloth vacuum cleaner bags by utilizing a method of treating the bags with an antibacterial and antifungal composition. This treatment attaches the antimicrobial composition to the bag's fabric.

Additional objects, features and advantages will be apparent in the written description which follows.

SUMMARY OF THE INVENTION

The invention features a nondisposable vacuum cleaner bag impregnated with a dual component, antimicrobial treatment with both antibacterial and antifungal activity.

The dual component antimicrobial composition and treatment consists of one component that is primarily antibacterial and a second component that is primarily antifungal, yet is effective against bacteria. The antimicrobial composition effectively reduces the quantity of harmful bacteria and fungi by at least 70% for the useful life of the bag. Preferably, the antimicrobial composition remains effective for reducing the quantity of harmful bacteria and fungi by at least 99% for the life of the bag. Preferably during treatment, the antimicrobial composition attaches to the material making up the flexible sidewalls of the bag and reduces the quantity of harmful bacteria and fungi without substantially leaching from the treated substrate under the conditions of use.

A preferred, dual component treatment comprises an aqueous solution of approximately 1% by weight Poly[oxyethylene(dimethyliminio)ethylene (dimethyliminio)ethylene dichloride] and 1% by weight 2(Thiocyanomethylthio)benzothiazole. The particularly preferred, dual component treatment comprises an aqueous solution of approximately 1% by weight Poly[oxyethylene(dimethyliminio)ethylene (dimethyliminio)ethylene dichloride] and 1% by weight 2(Thiocyanomethylthio)benzothiazole with a nonionic detergent, and compounds that promote stiffening and hand build-in of the fabric.

The bag is intended to be used with a vacuum cleaner of the type having an airflow generating means contained in a main housing for producing an airflow out of the air duct of the housing. The bag has a porous body defining a normally closed interior for dirt and dust collecting and a mouth opening. Preferably, the bag is made of cloth and is suitable for use with an upright vacuum cleaner. Connecting means are provided for securing the mouth opening of the flexible body to the air duct of the main housing to thereby produce an airflow through the flexible body for exhaust into the atmosphere. Preferably, the bag also includes an oscillator tube of a flexible material having an interior, an open end at one extent and an intake opening at the opposite extent. The intake opening of the oscillator tube communicates with the mouth opening of the bag body so that the airflow from the main housing passes through the oscillator tube and causes oscillations which vibrate the bag.

In the method of manufacturing the cloth bag of the invention, the cloth is impregnated with the dual component, antimicrobial treatment after the dyeing of the fabric. Most preferably the cloth is treated as a one step process before drying.

The above as well as additional objects, features, and advantages of the invention will become apparent in the following detailed description.

BRIEF DESCRIPTION OF THE DRAWING

The novel features believed characteristic of the invention are set forth in the specifications and claims. The invention itself; however, as well as a preferred mode of use, further objects and advantages thereof, will best be understood by reference to the following detailed description of an illustrative embodiment when read in conjunction with the accompanying drawings, wherein:

FIG. 5 is an isolated, perspective view of the bag of FIG. 1; and

FIG. 6 is a simplified, schematic view of the airflow through the upright vacuum cleaner of FIG. 1 during operation.

DETAILED DESCRIPTION OF THE INVENTION

The goal of this invention is to provide a safe and effective antimicrobial treatment for nondisposable vacuum cleaner bags. Preferably, the treatment safely reduces the quantity of harmful bacteria and fungi by at least 70% over the lifespan of the bag. Most preferably the treatment reduces the quantity of harmful bacteria and fungi by at least 99% over the life of the bag. The life of the bag equals the amount of time after treatment prior to use plus the time in actual use while attached to a vacuum cleaner. This period of time totals roughly between fifteen and twenty-one months of frequent commercial use. Vacuum cleaner bags usually tear after this time due to mechanical abrasion during use.

Figure 1:
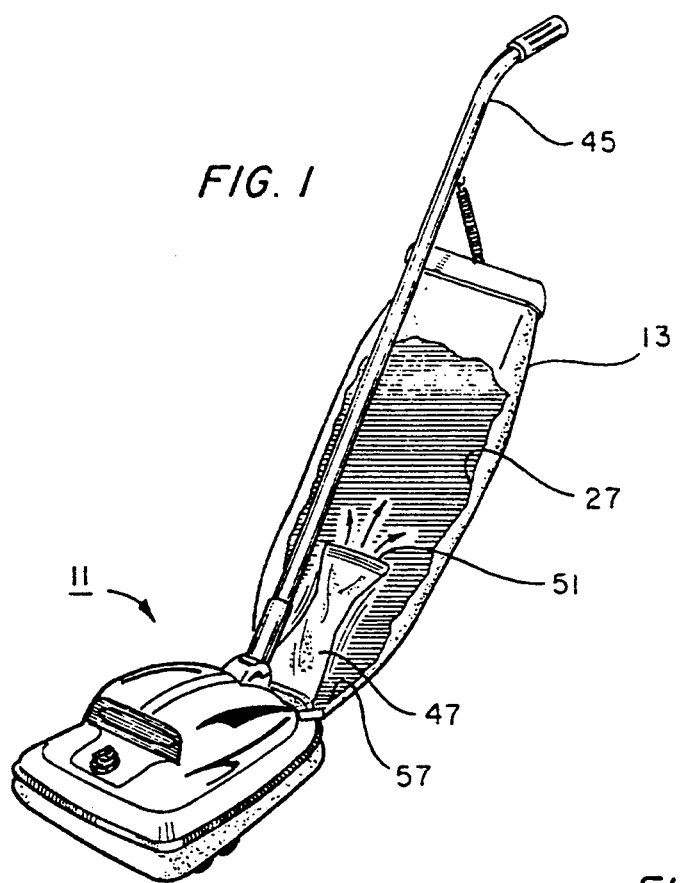
FIG. 1 is a perspective view of an upright vacuum cleaner and cloth bag of the invention with the bag sidewalls partly broken away for ease of illustration.

FIG. 1 shows the preferred embodiment of the apparatus of the invention, an upright vacuum cleaner 11 which features a cloth bag 13, treated with a dual component, antimicrobial composition. As shown in simplified fashion in FIG. 6, the vacuum cleaner 11 includes a conventional main housing 15, nozzle region 17, rotary agitator 19, and a vacuum generating means or motor-fan unit 21. The motor-fan unit creates a flow of dirt laden air, shown by the arrows in FIG. 6, through the main body 15 to a dirt collecting bag 13. Vacuum pressure is generated at the nozzle region 17 and the dirt laden air is pressurized by the motor-fan unit and forced through the main body, through air duct 23 and into the dirt collecting bag 13 which is attached to the duct 23.

Upright vacuum cleaners of the type under consideration are well known in the art. Such a device is commercially available from Southwest Manufacturers & Distributors, Inc., as the POWR-FLITE ® commercial upright Model P-747. Commercial vacuum cleaners of the type under consideration feature a "dump-out", reusable cloth bag and do not typically use an internal cloth or paper filter bag.

As shown in FIGS. 5 and 6, the bag of the invention includes preferably a porous, nondisposable, cloth body 25. The bag's sidewalls define a normally closed, dirt and dust collecting, interior 27 and a mouth opening 29. The mouth opening 29 includes a metal band clamp 31 with a latch 33 for connecting the mouth portion of the bag's flexible body to the air duct 23 of the main housing 15 to thereby produce an airflow through the flexible body which exhausts to the atmosphere. The outer bag 13 is of tubular-like construction and includes a top or upper end 35 which is connected to a bag clip 37. The bag clip 37 can be removed to allow the upper end 35 to be opened so that the bag can be "dumped" to empty the contents. A resilient means such as spring 39 is connected to an eyelet 41 of the bag clip 37 and is connected to a hook 43 on a pivoting handle 45 for support of the bag at its uppermost extension alongside the generally vertically extending pivoting handle.

The most preferred embodiment of the vacuum cleaner bag of the invention also features an oscillating means such as oscillator tube 47 which is located within the bag interior 27 and communicates with the mouth opening 29 of the bag body. Preferably, the oscillator tube is formed of a flexible material and has an interior 49, an open end 51 at one extent and an intake opening 53 at the opposite extent. Although various flexible wear resistant materials can be utilized, nylon is preferred for its strength, light weight and relatively slick surface or texture. The most preferred material is 420 denier coated nylon and is relatively non-porous as compared to the cloth material of the bag 13. The intake opening 53 of the tube 47 is arranged to communicate with the mouth opening 29 of the bag body so that the airflow from the main housing 15 passes through the oscillator tube on its way to the bag interior 27. Preferably, the intake opening 53 of the tube 47 is concentrically arranged within the mouth opening 29 of the bag 13 so that the bag mouth opening and clamp 31 circumscribes the intake opening 53 of the tube. In any case, the airflow from the air duct 23 passes first through the tube interior 49 and then into the bag interior 27.

Figure 2:
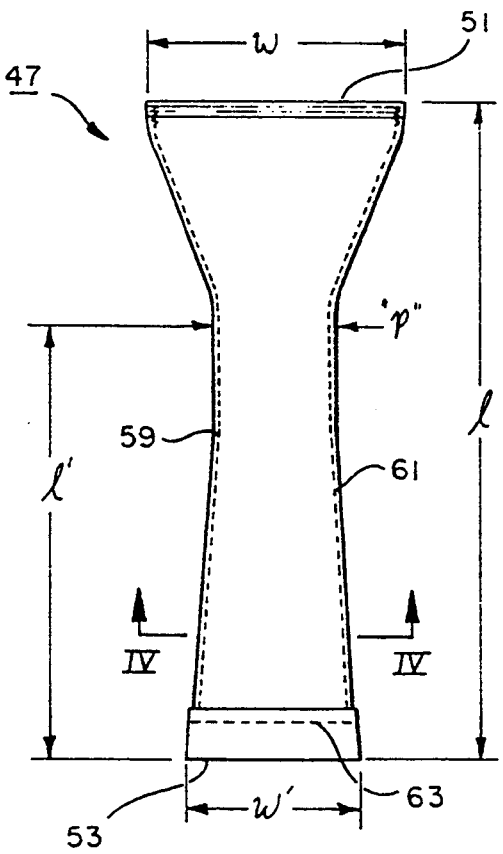
FIG. 2 is a simplified, top view of the oscillator tube of the bag of FIG. 1.

As shown in greater detail in FIGS. 2 and 6, the tube 47 forms an interior flow path (indicated by the arrows in FIG. 6), for directing air from the intake opening 53 to the tube open end 51. The flow path is designed with a predetermined "Venturi-style" profile to produce exhaust turbulence in the airflow exiting the open end 51. The Venturi effect is well known in science and is most often described with reference to a short tube with a constricted throat that is used to determine fluid pressures and velocities by measurement of differential pressures generated at the throat as a fluid traverses the tube.

As shown in FIG. 2, the tube has an overall length "l", a width "w" at the open end 51 and a width "w'" at intake opening 53. The width of the oscillator tube varies between the intake opening 53 and open end 51. More particularly, the width "w'" decreases from the intake opening 53 to an intermediate point "p" and then flares outwardly from the intermediate point to the width "w" at the open end 51. The Venturi effect operates as follows: Air flows from the main housing 15 at a given velocity and enters the intake opening 53 of the tube. As the air passes above the intermediate point "p", the increased diameter of the tube causes a sudden decrease in air velocity. The turbulence caused by the high velocity air which is entering the intake opening 53 and rapidly overtaking the slower air that has already passed through the point "p". This results in a flapping action or oscillation of the tube which causes the tube 47 to beat or vibrate the interior sidewalls 27 of the bag 13. As the tube 47 beats against the sidewalls of the bag 13, dirt is dislodged from the bag sidewalls and is deposited at the bottom of the bag chamber (generally at area 57 in FIG. 1). This prevents the dirt from clumping against the sidewalls, allowing the vacuumed debris adequate exposure to the antimicrobial treated sidewalls. The tube open end 51 also provides an entry point for the dirt laden air into the bag chamber above the collection area 57 of the dirt which has already been vacuumed into the bag 13.

Figure 3:
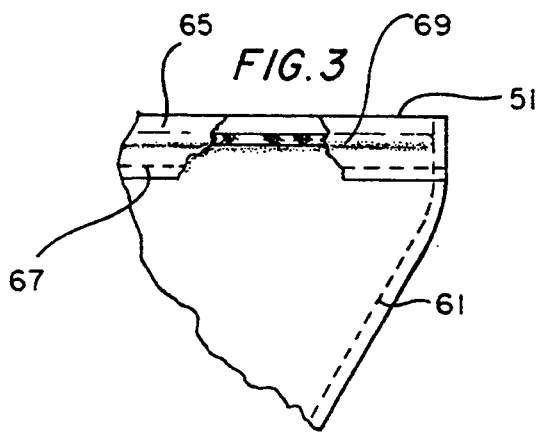
FIG. 3 is a partial close-up view of the open end of the oscillator tube of FIG. 2 showing the stitching thereof.
Figure 4:
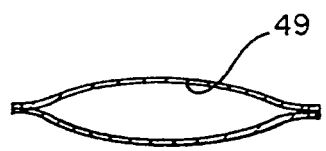
FIG. 4 is a cross-sectional view taken along lines IV—IV in FIG. 2.

As shown in FIG. 2, the material of the tube 47 can be cut and stitched along the sides 59, 61 during manufacture. The seams are turned to the outside of the tube to present a smooth surface to the incoming dirt laden air to maintain the maximum air velocity at the intermediate point "p". A single piece of material could also be doubled over and stitched along only one side 59. As shown in FIG. 2, the intake opening 53 is turned back to the outside and stitched along a seam 63. As shown in FIG. 3, the open end 51 is turned back and stitched along parallel seams 65, 67. The seams 65, 67 form a hem for a rope 69 which passes about the circumference of the open end 51 to provide added strength and wear resistance.

In a specific example, a tube 47 manufactured from 420 denlet nylon having the following dimensions:

| | |
|---|---|
| "l" | 16.75 inches |
| "w" | 7.875 inches |
| "l'" | 12.0 inches |
| "p" | 3.75 inches |
| "w'" | 4.875 inches |

The overall length of the bag 13 was 28 inches.

The vacuum cleaner bag's fabric is treated during manufacturing, prior to cutting and stitching the bag. Consequently, the antimicrobial components of the invention must attach to the fabric under extreme manufacturing conditions, yet function effectively as antibacterial and antifungal agents.

Figure 7:
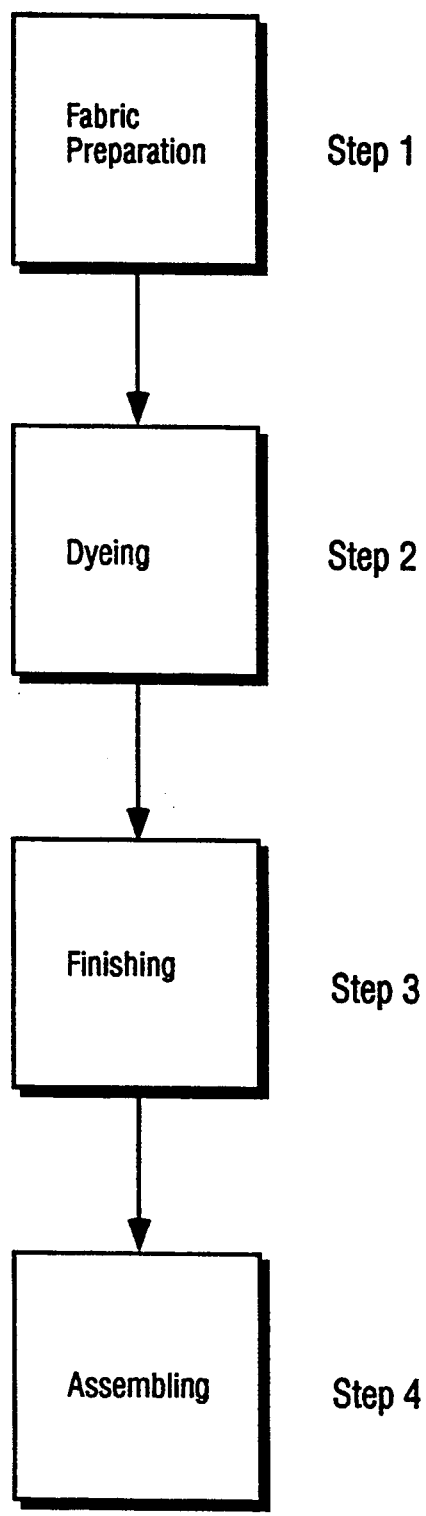
FIG. 7 is a block diagram illustrating the method steps used in manufacturing the vacuum cleaner bag of the invention.

For manufacturing the vacuum cleaner bag fabric, the following steps illustrated in FIG. 7 and briefly described below are typically used for finishing cloth and are well known to the textile industry. Fabric is prepared prior to dyeing by desizing, scouring and bleaching using a conventional, continuous preparation range (illustrated as step 1 in FIG. 7). After preparation, the fabric is dyed on a continuous piece dye range, preferably using Dyed Fibre Reactive Royal Blue (step 2). Then the dyed cloth is finished through any necessary finishing steps. Additional steps, for example drying, may be done prior to or after the antimicrobial treatment. Most preferably for the process of the invention, the fabric rolls from the dyeing solution and is finished with the dual component, antimicrobial composition as a single continuous step without any additional steps (step 3).

The dual component, antimicrobial treatment can be applied to the cloth by dipping, padding, or spraying until adequately wet. Dipping the fabric after processing and drying and padding are preferred. Most preferably, the antimicrobial composition is added to the fabric by a pad-emulsion process which is well known in the textile industry. The bath used for treating the fabric is at a neutral pH and at ambient factory temperatures. Most preferably, the bath pH is at 7.1. The bath temperature has no effect on the attachment of the dual component, antimicrobial composition to the type of cloth used for the invention.

After antimicrobial treatment, the fabric rolls onto dry cans where the cloth dries at 200° F. Dried fabric is shipped for the final cutting, stitching and assembly into vacuum cleaner bags (step 4 in FIG. 7).

The dry cans used during the manufacturing process are hot, generally about 200° F. Consequently, the process requires nonvolatile and stable components at these operating temperatures. Components volatile at about 200° F. or less reduce the concentration of antimicrobial agents attached to the fabric. Volatile components may also dissipate into the air. If the antimicrobial components degrade during manufacturing, the amount attached also decreases significantly. Further, any degradation products, including any harmful products, release into the environment.

The cloth is strongly anionic after dyeing. A strongly anionic fabric requires the antimicrobial components to attach to a highly charged substrate. Negatively charged antimicrobial agents would be repelled from the fabric. Strongly nonpolar agents should also be repelled by the charges. This requires the selection of cationic, polar or positively charged amphipathic agents. Positively charged agents tend to attach strongly to anionic substrates, therefore they are often preferred. After the antimicrobial components attach to the cloth, they must remain attached and survive any final manufacturing steps without degradation. Minimizing the anionic charges on the fabric may require the addition of extra steps to the procedure.

Successful attachment of the antimicrobial components demands even dispersement across the fabric during treatment. For obvious reasons, antimicrobial components not evenly attached to the fabric allows areas of the fabric to remain untreated. This decreases the amount of antimicrobial agents available to attack the microorganisms within the vacuum cleaner bag. The problem of even dispersement is often reduced by the addition of a nonionic wetting agent.

The dual component, antimicrobial treatment of the invention consists of both antibacterial and antifungal activities. The two components can be used together as a single composition or added separately as a two-step process during manufacturing. Preferably, the components are added together as one composition after dyeing the fabric. The treatment is best carried out as a water solution of the products. An aqueous solution of the treatment can be prepared by adding the components of the antimicrobial composition to water and stirring.

The preferred antibacterial component is poly[oxyethylene(dimethyliminio)ethylene (dimethyliminio)ethylene dichloride] (POED) available as BUBOND® 60 (Buckman Laboratories, Memphis, Tenn.). The second preferred component 2(Thiocyanomethylthio)benzothiazole (TCMTB) has both antibacterial and antifungal properties and is available as BUSAN® 30L (Buckman). The composition may range from 0.1% to 1.0% by weight of either or both components. The most preferable concentration of each component is an aqueous solution of 1% by weight of both POED and TCMTB.

For the manufacturing method, the preferred composition is composed of POED, TCMTB, a nonionic wetting agent, a vinyl acetate homopolymer emulsion and a crosslinking acrylic copolymer emulsion. The nonionic wetting agent can be any of the types used in the textile industry, such as polidoconal, TWEEN type materials, octoxynol and tricresyl phosphate, most preferably tricresyl phosphate such as MARKWET 871 (National Starch and Chemical Corp., Bridgewater, N.J.). The vinyl acetate homopolymer emulsion used is DUROSET Hill (National Starch and Chemical Corp.). The Crosslinking acrylic copolymer emulsion is DUROSET 484 (National Starch and Chemical Corp.). Most preferably the composition consists of about 7.5% OWB Ion wet basis] POED, 7.5% OWB TCMTB, 0.25% OWB MARKWET 871, 3.0% OWB DUROSET H100 and 3.0% OWB DUROSET 484, with the amount of water pick-up about 58%.

The pairing of POED and TCMTB for a dual component antimicrobial treatment has unexpected results. The antimicrobial treatment remains effective against harmful bacteria over a period of time greater than the equivalent of one year. Both components easily attach to the fabric, possibly through sequestration. They are nonvolatile. They are stable in the manufacturing process, surviving temperatures at about 200° F. Neither component degrades during the manufacturing process and are not particularly harmful to either humans nor the environment.

The treatment incorporated more of the antimicrobial component TCMTB than originally expected. Chemical analysis of a fabric sample treated in a laboratory indicated that either a one-step or a two-step method of application incorporated the TCMTB component. Both procedures showed desirable uptake of the antimicrobial agents, however, some differences were noted. For instance, the one-step process incorporated more TCMTB than the two-step process. The one-step process is preferred due to the ease of application and antimicrobial up-take levels. Recovery levels were about 90% for the one-step process and 72% for the two-step process when measured using high performance liquid chromatography [HPLC]. Under manufacturing conditions, more of the TCMTB component was recovered from the fabric than initially expected. The fabric appeared unsaturated at levels of 0.2% by weight of both POED and TCMTB. Comparison of HPLC analysis of fabric swatches from application in the laboratory and application during manufacturing indicated that slightly more of the TCMTB was incorporated under the manufacturing conditions.

Another unexpected result of using a dual component system is that the two components together had a synergistic effect. Table 2 illustrates the synergy found when the two compounds are used together. Previous testing indicated POED was effective against *Staphylococcus aureus,* but less effective against *Pseudomonas aeruginosa.* The combination of POED with TCMTB showed a greater than two log reductions against *P. aeruginosa.*

Another advantage of using the dual component system of the invention is that with two components protect against the possibility of encountering microorganisms resistant to two antimicrobial agents. For example, resistant bacteria usually resist only one type of treatment. Since both are effective against bacteria, the component to which the bacterium is sensitive attacks the drug resistant bacterium. A bacterium resistant to two disparate types of antimicrobial components as found in this treatment would be unusual.

The following examples illustrate the efficacy of the antibacterial and antifungal activities of the invention under laboratory conditions and are not intended to limit or restrict the invention in any way.

EXAMPLE 1

The vacuum cleaner bag fabric was cut into 2.5×2.5 cm swatches. The swatches were sterilized for 30 minutes at 15 psi at 121° C. After cooling, the swatches were dipped for 15 minutes in an aqueous 1% by weight stock solution of POED and 1% by weight TCMTB made fresh the day of treatment. Treated swatches were air dried for 1-3 days at room temperature before use.

The following methodology testing antibacterial activity employs a slight modification of the AATCC protocol for the *Evaluation of Antibacterial Finishes on Fabrics,* Test Method 100-1981, Quantitative Procedure (Reference or Confirmatory Test), which is familiar to the textile industry. Briefly, the test is as follows:

Inoculate the swatches with 1 ml of inoculum of a 24 hour broth culture at a concentration of approximately 1 to 10 million bacteria/ml. The number of swatches used equals the number that can adequately absorb 1 ml of inoculum. After incubation, add 100 ml of neutralizer solution to the control and test jars. Shake vigorously for one minute. Make serial dilutions and plate in tryptone glucose extract agar. Incubate all plates for 24 hours at 37° C. After 24 hours, count the colonies formed on the plates and report the percent reduction as compared to the untreated control swatches. If the plates are negative, incubate an additional 24 hours at 37° C. and recount the plates. To shorten the amount of time required for stability studies, 50° C. was selected as the incubation temperature used.

The bacterial strains tested cover a wide range of potentially harmful bacteria and are allowed to flourish under advantageous conditions. These bacteria are inoculated onto the fabric in growth media containing all necessary ingredients for optimal bacterial growth.

Even under optimal conditions, the dual component, antimicrobial treatment effectively reduces bacterial growth at least about 99%, with four species of bacteria reduced by 99.99% at the equivalent of nine months as compared to the untreated controls. The treatment effectively reduced the quantity of *S. aureus* and *P. aerogtnosa* by at least 99.999% as compared to the untreated controls at the equivalent of one year.

TABLE I

STABILITY DATA OF FABRIC TREATED WITH ANTIMICROBIAL TREATMENT

| Organism | Counts In CFUs[1] | No. of days at 50° C.[2] | % Reduction |
|---|---|---|---|
| *Staphylococcus aureus* ATCC 6538 | <$10^2$ | 22 | 99.999 |
| *Pseudomonas aeruqinosa* ATCC 15442 | <$10^2$ | 22 | 99.999 |
| *Salmonella cholerasuis* ATCC 10708 | $1.5 \times 10^3$ | 14 | 99.994 |
| *Streptococcus faecalis* ATCC 39302 | $1.0 \times 10^5$ | 14 | 98.925 |
| *Klebsiella pneumoniae* ATCC 4352 | <$10^2$ | 15 | 99.999 |
| *Enterobacter aerogenes* ATCC 13048 | $9.1 \times 10^4$ | 15 | 98.910 |

[1]CFUs = Colony forming units per ml following 24 hr. exposure to treated fabric.
[2]50° C. for 15 days is equivalent to 25° C. for 9 months, while 22 days is equivalent to 12 months.

EXAMPLE 2

The methodology followed was the same as for Example 1 with the following modifications. The POED and TCMTB were tested separately and combined. The incubation was for 18 hours at 37° C. The swatches were inoculated with 10-20 thousand bacteria/ml. After incubation, 30 ml of neutralizer solution was added to both the control and test jars. After plating in tryptone glucose extract agar, the plates were incubated for 48 hours and 37° C. At the end of 48 hours, the plates were counted for colonies formed on the plates.

TABLE II

ANTIBACTERIAL ACTIVITY OF POED AND TCMTB AGAINST *Pseudomonas aeruginosa* ATCC 15442

| | | ppm Treatment | Percent Reduction |
|---|---|---|---|
| NONE | +POED | 10,000 | 99.4 |
| TCMTB | NONE | 10,000 | 98.20 |
| TCMTB | +POED | 10,000 | 99.9994 |
| TCMTB | +POED | 10,000 | 99.99994 |

EXAMPLE 3

The fabric swatches were prepared as described above in Example 1 except that the POED and the TCMTB were tested individually. The methodology of the antifungal treatment was a modification of the AATCC Test Method 30-1988, *Antifungal Activity, Assessment on Textile Material: Mildew and Rot Resistance of Textile Material,* Test II, which is familiar to the textile industry. Briefly, the test protocol was as follows:

Fungal challenge consisted of (1) a yeast challenge which was a mixture of *Candida albicans* and *Saccharomyces cervisiae* and (2) a filamentous mold challenge which consisted of a mixture of *Pencillium roqueforti, Aspergillus niger* and *Fusarium oxysporum* spores. All fungal species were individually grown at 30° C. in potato dextrose agar (PDA). Yeast or mold suspensions were mixed in a 1:1 sterile saline and spread with a sterile cotton tip onto pre-poured PDA plates. Subsequently the swatches were placed in the center of the seeded plate and incubated at room temperature for the period of time. Efficacy was assessed by measuring the zones of inhibition present around the treated swatches every 7 days for a total period of 21 days. (Note: This test requires leachability of the chemical.)

The test ran under extremely moist conditions, not usually found within a vacuum cleaner bag unless the bag is dipped in water. The average percent water content of the agar plates was approximately 98.5%. Due to the nature of the screening technique, zones of inhibition measured efficacy as well as the amount of leaching of the antifungal component. Leaching was moderate under the test conditions. Due to the leaching, all treatments showed a decrease in the zone of inhibition in relation to time.

TABLE III

TCMTB TREATMENT OF VACUUM CLEANER BAGS AVERAGE ZONE OF INHIBITION (cm)

| PPM | MOLD | | | YEAST | | |
|---|---|---|---|---|---|---|
| DAY | 7 | 14 | 21 | 7 | 14 | 21 |
| 0 | 0 | 0 | 0 | 0 | 0 | 0 |
| 800 | 1.12 | 0.53 | $0^n$ | 0.62 | 0.73 | 0.46 |
| 1000 | 1.47 | 0.86 | $0^n$ | 0.75 | 0.73 | 0.80 |
| 1500 | 1.20 | 0.66 | $0^n$ | 1.02 | 0.93 | 0.60 |
| 2000 | 1.20 | 0.80 | $0^n$ | 1.35 | 1.20 | 0.83 |

$^n$no zone of inhibition and no fungal infestation of fabric.
Controls showed fungal encroachment on the fabric by the third day of incubation.

EXAMPLE 4

The fabric was treated as described in Example 1. In Table IV, the methodology followed was the same as in Example 3 except for the incubation period was for seven days.

In Table V, the methodology was the same as Example 3 except for the following:

Two additional strains of fungi, *Myrothecium verrucaria* and *Trychophytom mentagrophytes* were tested. Both antimicrobial agents were applied to the fabric and tested together, with one batch tested after application in the laboratory and a second batch tested after application during a manufacturing run. The incubation period was for seven days.

TABLE IV

FUNGAL CHALLENGE OF FABRIC TREATED WITH ANTIMICROBIAL TREATMENT

| Organisms tested | 7 days at 30° C. zones of inhibition (width in mm) |
|---|---|
| *Chaetomium globosum*[1] | 14.83 |
| *Cladosporium resinae* | 15.0 |
| *Trichoderma viride*[1] | 8.0 |
| *Fusarium oxysporum* | 10.33 |
| *Aspergillus niger* | 7.33 |

[1]Cellulose degrading fungi
All untreated controls showed growth on the fabric with no zone of inhibition.

TABLE V

FUNGAL CHALLENGE OF FABRIC TREATED WITH ANTIMICROBIAL TREATMENT

| | 7 DAYS incubation at 30° C. Zone of inhibition (Width/mm) | | |
|---|---|---|---|
| | Treatment 1[1] | Treatment 2[2] | CONTROL |
| *Myrothecium verucaria*[3] | 12.3 | 12.6 | * |
| *Trichophyton* | >17.0 | >17.0 | * |
| *mentagrophyhtes*[4] | | | |
| *Penicillium roqueforti* | 14.6 | 16.0 | * |
| *Cladosporium resinae* | 17.0 | 17.0 | * |
| *Candida albicans* | 8.6 | 7.0 | * |

*Control plates demonstrated complete fungal encroachment to the fabric.
[1]Laboratory dip.
[2]Manufacturing run.
[3]Cellulose degrading fungi.
[4]"Athletes Foot" fungus.

EXAMPLE 5

The fabric treatment and methodology were followed as described in Example 1 with the following exceptions. The tested organisms were not bacteria but yeast and yeast-like fungi and they were incubated at 30° C. for 16–18 hours.

TABLE VI

YEAST AND FUNGAL CHALLENGE OF FABRIC TREATED WITH ANTIMICROBIAL TREATMENT

| Organisms tested: | CFU[1] recovered at zero dilution |
|---|---|
| *Candida albicans* | 0 |
| *Saccharomyces cerevisiae* | 0 |
| *Aureobasidium pullulans* | 0 |
| *Fusarium oxysporum* | 0 |

[1]CFU: Colony forming units. Average inoculum introduced per ml; $2.8 \times 10^5$ CFU. Total recovered CFU from untreated controls swatches after 16–18 hour incubation at 30° C. was $1.32 \times 10^5$ viable cells.
No viable colonies could be isolated from the treated fabric. Control swatches were untreated.

TABLE VII

FUNGAL CHALLENGE OF FABRIC TREATED WITH ANTIMICROBIAL TREATMENT

| | COLONY FORMING UNITS RECOVERED | | |
|---|---|---|---|
| | Treatment 1[1] | Treatment 2[2] | CONTROL (Cells/ml) |
| *Sacharomyces cerevisiae* | 0 | 0 | $6.25 \times 10^5$ |
| *Crytococcus neoformans* | 0 | 0 | $3.7 \times 10^5$ |
| *Rhodotorula rubra* | 0 | 0 | $4.8 \times 10^5$ |

[1]Laboratory dip.
[2]Manufacturing run.

An invention has been provided with several advantages. The cloth vacuum cleaner bags of the invention effectively reduces the growth of bacteria and fungi for the life of the bag. The antimicrobial treatment is stable and therefore does not degrade, dissipate or leach into the environment. The treatment can be performed as a part of the bag manufacturing process, such as after the dye application and prior to drying, or can be applied as a post dip treatment by dipping the bag fabric in a solution of the active ingredient after drying. The combination of an antimicrobial treatment with the oscillating feature of the cloth bag is especially effective in preventing the growth of harmful bacteria and fungi. The treated bags are particularly well suited for use in commercial and industrial environments such as hospitals, hotels, restaurants, and the like.

While the invention has been described in only one of its forms, it should be apparent to those skilled in the art that it is not so limited, but is susceptible to various changes and modifications without departing from the spirit thereof.

What is claimed is:

1. A method for manufacturing a dirt and dust collecting apparatus for a vacuum cleaner, the method comprising the steps of:
   providing porous cloth starting material;
   desizing, scouring and bleaching the cloth starting material;
   dyeing the cloth;
   impregnating the cloth by applying a solution which contains a dual component, antibacterial and antifungal treatment by pad-emulsion and allowing the cloth to dry, one component of the treatment being primarily antibacterial and one component being primarily antifungal;
   assembling the treated cloth into a porous, nondisposable, cloth bag which defines a dirt and dust collecting apparatus;
   wherein the antibacterial and antifungal treatment effectively reduces the growth of harmful microorganisms by at least 70.0% at ambient temperatures for the life of the bag.

2. The method of claim 1 whereby the antibacterial and antifungal treatment effectively reduces the growth of harmful bacteria by at least 70.0% and harmful fungi by at least 70% at ambient temperatures for the life of the bag.

3. A method for manufacturing a dirt and dust collecting apparatus for a vacuum cleaner, the method comprising the steps of:
   providing porous cloth which has been desized, scoured and bleached;
   dyeing the cloth;
   impregnating the cloth by applying a solution which contains the dual component, antibacterial and antifungal treatment by dipping, padding or spraying and allowing the cloth to dry;
   assembling the treated cloth into a porous, cloth bag which defines a dirt and dust collecting apparatus;
   wherein the antibacterial and antifungal treatment effectively reduces the growth of harmful bacteria by at least 99.0% and harmful fungi by at least 99.0% at ambient temperatures for the life of the bag and wherein the antibacterial and antifungal treatment comprises 2(Thiocyanomethylthio)benzothiazole and Poly oxyethylene(dimethyliminio)ethylene (dimethyliminio)ethylene dichloride.

4. The method of claim 3 wherein the antibacterial and antifungal treatment is an aqueous solution at a concentration of about 1% by weight of 2(Thiocyanomethylthio)benzothiazole and about 1% by weight of Poly(oxyethylene(dimethyliminio)ethylene (dimethyliminio)ethylene dichloride).

* * * * *